V. KOBLER.
MECHANICAL MOVEMENT.
APPLICATION FILED APR. 1, 1913.
1,107,673.
Patented Aug. 18, 1914.
2 SHEETS—SHEET 1.
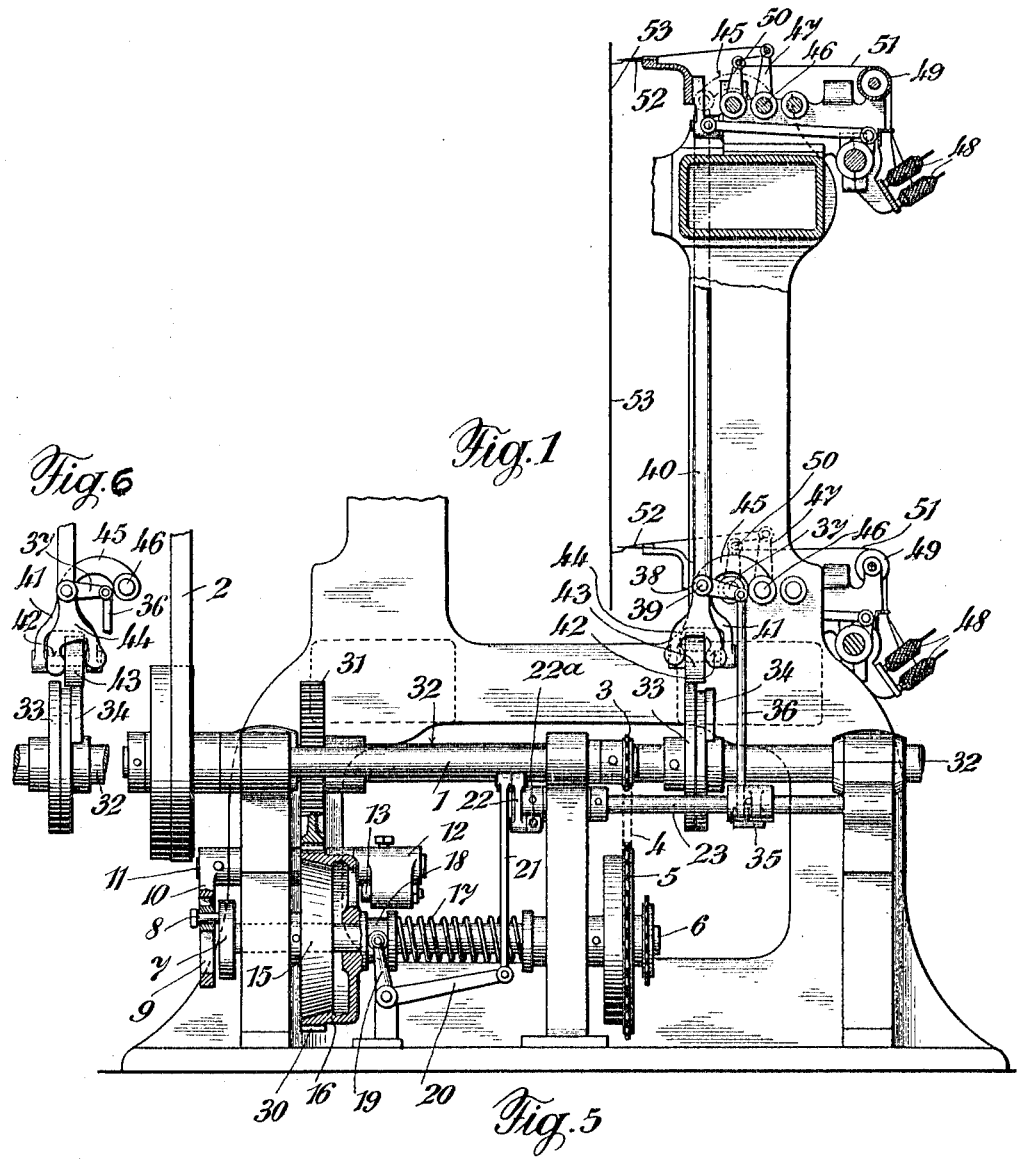
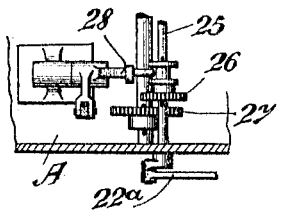
Witnesses:
Wharton Phipps
Worthington Campbell
Inventor:
Victor Kobler
BY
Redding Greeley + Goodlett
Atty's

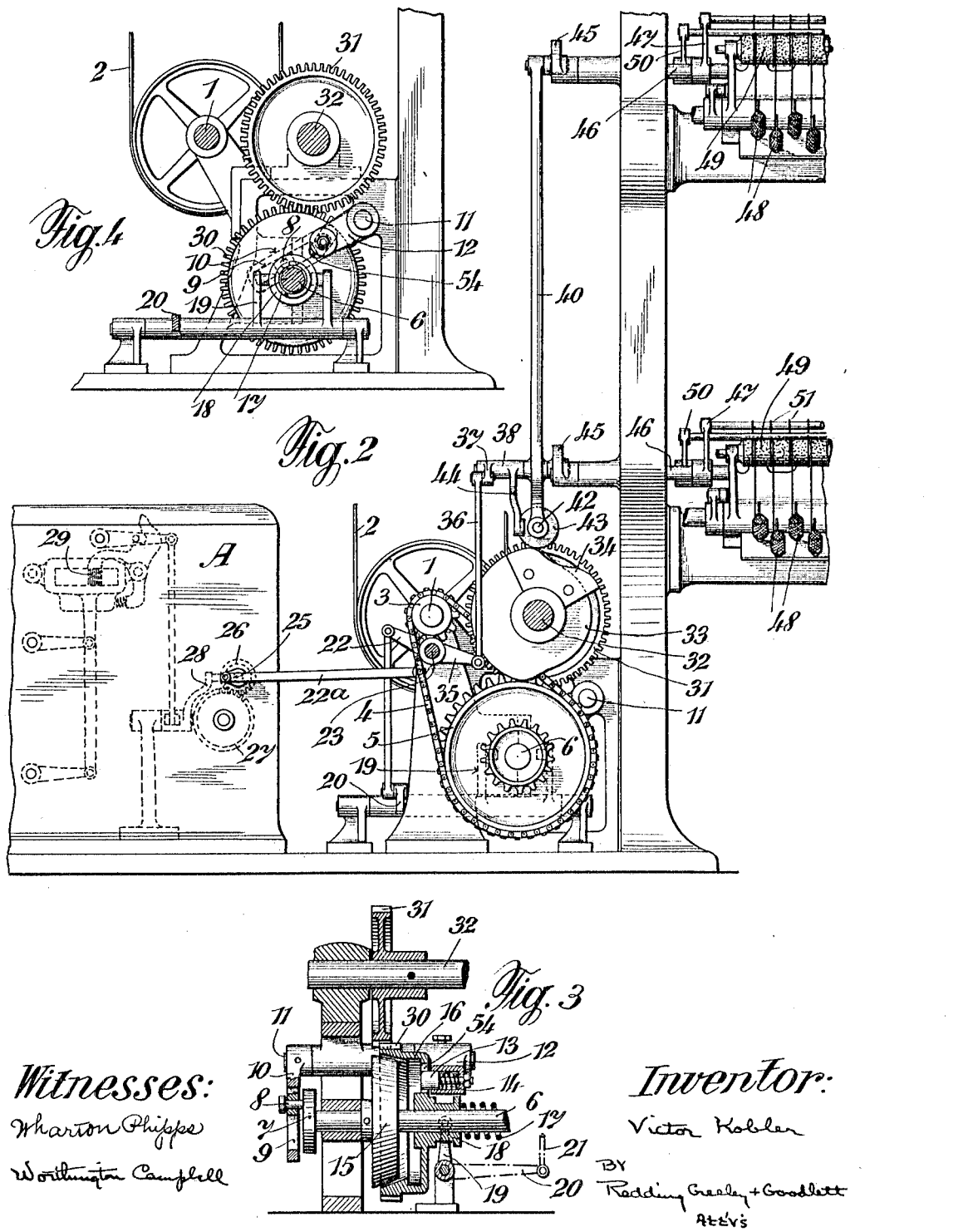

UNITED STATES PATENT OFFICE.

VICTOR KOBLER, OF RORSCHACH, SWITZERLAND, ASSIGNOR TO THE FIRM OF ADOLPH SAURER, OF ARBON, SWITZERLAND.

MECHANICAL MOVEMENT.

1,107,673.     Specification of Letters Patent.     Patented Aug. 18, 1914.

Application filed April 1, 1913. Serial No. 758,106.

*To all whom it may concern:*

Be it known that I, VICTOR KOBLER, a citizen of the Republic of Switzerland, residing at Rorschach, Switzerland, have invented new and useful Improvements in Mechanical Movements; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In embroidery machines it is necessary, after the main driving gear of the machine has been stopped, to impart a temporary reciprocatory motion to the gear for operating the devices which act upon the embroidering threads, such as the embroidering needles, the shuttles, the thread guides, and the thread brake, for the purpose of facilitating withdrawal of the threads, that is to say, of slacking the same. This, for instance, is requisite when perforating is to be done after embroidering, as the perforators are lower than the needles, so that the fabric, on each side of which are the taut needle and shuttle threads respectively, has to be shifted. In those embroidery machines in which a pantograph is used, this slacking of the threads is performed through to and fro motion of the embroidery machine driving gear by hand.

The present invention resides in means whereby the thread slacking can be effected mechanically in automatic embroidery machines. According to this invention the operation of disengaging the driving gear of the embroidery machine, which is performed automatically by the jacquard card, throws into engagement means which impart to the embroidery machine driving gear the reciprocatory motion for the purpose of slacking the threads. This, for example, can be effected in such manner that on disengagement by the jacquard mechanism of a clutch which couples the machine driving gear with the main driving gear, that part of the clutch which remains in connection with the embroidery machine driving gear becomes coupled with a shaft which is rocked by the main driving gear. The said clutch part can, for instance, by being slid, engage by means of a hole provided in it, a pin secured to a shaft which receives a continuous rocking motion from the main driving gear.

A preferred embodiment of the invention is illustrated in the accompanying drawings, in which machine parts unnecessary for a clear understanding of the invention have been omitted.

Figure 1 is a view in end elevation and part section of the jacquard embroidery machine to which the invention is applied. Fig. 2 is a view in front elevation partly in section of the mechanism shown in Fig. 1. Fig. 3 is a sectional view showing the clutch mechanism and coöperating parts in a different position. Fig. 4 is a cross sectional view of certain parts which are partly obscured in Fig. 2. Fig. 5 shows a portion of the jacquard mechanism in plan. Fig. 6 is an elevation of certain mechanisms shown in Fig. 1, drawn in another position.

1 is the main shaft, which receives its motion from the belt 2, which motion is transmitted to another shaft 6 by means of sprocket wheels, 3, 5 and a chain 4. Mounted on the shaft 6 is a crank disk 7, whose pin 8 carries a sliding block which engages in the slot 9 of a lever 10 fixedly mounted on a shaft 11. This shaft 11 also has secured to it an arm 12, in which there is located a slidable pin 13, controlled by a spring 14. On the shaft 6 there is fixedly mounted a friction bevel wheel or male clutch member 15, which in conjunction with a second friction bevel wheel or female clutch member 16 constitutes a clutch. The wheel 16 is slidably mounted on the shaft 6, and is forced toward the wheel 15 by a spring 17. Integral with the wheel 16 is a grooved boss or hub 18, which is embraced by a fork 19, rigidly connected with a pivotal lever 20, which is connected by a rod 21 with one arm of a bent lever 22, secured to an auxiliary shaft 23. Jointed to the lever 22 is a crank rod 22ª, whose crank is mounted on a shaft 25 of the so-called automatic or jacquard mechanism A (Figs. 2 and 5).

This shaft 25 can be partially rotated by the continuously revolving gear wheel 27, on a pinion 26 being slidden into engagement with the wheel 27. This engagement is effected, according to the pattern in use, by means of the automatic mechanism A, with the aid of a lever 28, which in familiar manner makes a short to and fro movement, depending upon the position of the jacquard needles 29, which are set in well-known manner by the perforated jacquard cards. Thus, by means of the automatic mechanism A the boss 18 can be slid on the shaft 6 and the clutch parts 15, 16 hence thrown into or out of engagement. The outer periphery of the clutch member 16 is provided with teeth 30, which constantly mesh with a toothed wheel 31, no matter whether the clutch parts 15, 16 are engaged or disengaged.

The wheel 31 is secured to the embroidery machine shaft 32, on which there is also mounted a cam 33 to the side of which a cam plate 34 is secured. To the auxiliary shaft 23 there is fixed a lever 35, which is connected by a rod 36 with a lever 37, which extends from a collar 38, loosely embracing a pin 39, projecting from a rod 40. This rod 40 terminates in a fork 41 (Figs. 1, 2 and 7), having a pin 42 on which there is mounted a rotatable and axially slidable roller 43. From the collar 38 there extends also a fork 44, which engages the roller 43, so that by sliding the hub 18 the roller 43 can be pushed either into engagement with the cam 33 or with the cam plate 34. The rod 40 is jointed to curved levers 45, which are mounted on shafts 46, on which are also mounted the major thread looseners 47, over which there pass the taut embroidering threads 51, coming from the bobbins 48 and running over the brake rollers 49 and minor thread looseners 50, and threaded through the embroidering needles 52 and coöperating with the embroidering threads on the other side of the fabric 53, which come from the shuttles (not shown) reciprocating in inclined direction.

The mode of operation is as follows. Supposing the jacquard needles 29 to be so set by the jacquard card that the shaft 25 is turned through a short distance, the rod 22ª will move the rod 21 and thus cause the hub 18 to be slid from the position shown in Fig. 1 into that shown in Fig. 3. The friction clutch will thus be thrown out, so that the wheel 16 is no longer rotated by the wheel 15. It will, however, continue to turn, owing to its kinetic energy, and on its following rotation the pin 13 will snap into a hole 54 in the wheel 16 and thus couple the latter with the shaft 11. The result of this is, that the friction wheel 16 will be oscillated by the shaft 11 and the motion will be imparted by the gears 30, 31 to the shaft 32 and cams 33, 34. On sliding of the hub 18, however, the fork 44 will have been vibrated by means of the lever system 35, 36, 37, and thus the roller 43 pushed from the cam 33 onto the cam 34. It is obvious that the rocking of the shaft 32 will thus cause vibration of the major thread looseners 47, as indicated by positions $x$ and $y$ in Fig. 6, whereby the embroidering threads 51 will be loosened.

I claim:

1. In a jacquard embroidery machine, in combination, a main driving shaft, a driving shaft for the machine, and a third shaft, and means for rocking the latter from the main shaft, means for coupling the first two said shafts comprising a clutch the one member of which is axially slidable and in the one end position effects coupling of the main driving shaft with the machine driving shaft, and in the other end position effects coupling of the machine driving shaft with the said third shaft.

2. In a jacquard embroidery machine, in combination, a continuously rotating clutch member, a coöperating clutch member, a member having a reciprocatory motion, and means to effect disengagement of the coöperating clutch member from the continuously rotating clutch member and engagement thereof with the reciprocating member.

3. In a jacquard embroidery machine, in combination, a continuously rotating shaft, a clutch member mounted thereon, a coöperating clutch member loosely mounted on the shaft, a member having a reciprocatory motion, and means to effect disengagement of the second clutch member from the first clutch member and engagement thereof with the reciprocating member.

4. In a jacquard embroidery machine, in combination, a continuously rotating shaft, a clutch member mounted thereon, a coöperating clutch member loosely mounted on the shaft, a member having a reciprocatory motion, means to effect disengagement of the second clutch member from the first clutch member and engagement thereof with the reciprocating member, and a machine driving shaft operatively connected with the second clutch member.

5. In a jacquard embroidery machine, in combination, a continuously rotating shaft, a clutch member mounted thereon, a coöperating clutch member loosely mounted on the shaft, a member having a reciprocatory motion, means to effect disengagement of the second clutch member from the first clutch member and engagement thereof with the reciprocating member, and operative means between said shaft and the reciprocating member for reciprocating the latter.

6. In a jacquard embroidery machine, in combination, a driving shaft for the mechanism to be controlled, means to impart to said shaft a movement of continuous rotation, means to impart to said shaft a movement of oscillation, two cams side by side on said shaft, transmitting mechanism, and means to effect operative relation between the transmitting mechanism and one or the other of said cams.

In testimony that I claim the foregoing as my invention, I have signed my name in presence of two subscribing witnesses.

VICTOR KOBLER.

Witnesses:
JAKOB NUSSBERGER,
RANDALL ATKINSON.

Copies of this patent may be obtained for five cents each, by addressing the "Commissioner of Patents, Washington, D. C."